US009699110B2

(12) United States Patent
Goldenberg et al.

(10) Patent No.: US 9,699,110 B2
(45) Date of Patent: Jul. 4, 2017

(54) ACCELERATING AND OFFLOADING LOCK ACCESS OVER A NETWORK

(71) Applicant: MELLANOX TECHNOLOGIES LTD., Yokneam (IL)

(72) Inventors: Dror Goldenberg, Zichron Yaakov (IL); Liran Liss, Atzmon (IL); Shlomo Raikin, Kibbutz Yassur (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 197 days.

(21) Appl. No.: 14/753,159

(22) Filed: Jun. 29, 2015

(65) Prior Publication Data

US 2016/0043965 A1 Feb. 11, 2016

Related U.S. Application Data

(60) Provisional application No. 62/035,527, filed on Aug. 11, 2014.

(51) Int. Cl.
*G06F 15/173* (2006.01)
*H04L 12/927* (2013.01)
*H04L 12/911* (2013.01)
*G06F 9/52* (2006.01)

(52) U.S. Cl.
CPC .............. *H04L 47/801* (2013.01); *G06F 9/52* (2013.01); *H04L 47/743* (2013.01)

(58) Field of Classification Search
CPC .... G06F 12/0246; G06F 9/544; G06F 3/0619; G06F 3/0688; G06F 3/0679
See application file for complete search history.

(56) References Cited

U.S. PATENT DOCUMENTS 5,913,213 A * 6/1999 Wikstrom ................. G06F 9/52
707/610
5,948,062 A * 9/1999 Tzelnic ............... G06F 11/1435
348/E5.008

(Continued)

OTHER PUBLICATIONS

Infiniband Trade Association, "InfiniBandTM Architecture Specification vol. 1", Release 1.2.1, Nov. 2007.

(Continued)

*Primary Examiner* — Peling Shaw
(74) *Attorney, Agent, or Firm* — D. Kligler IP Services Ltd.

(57) ABSTRACT

Lock access is managed in a data network having an initiator node and a remote target by issuing a lock command from a first process to the remote target via an initiator network interface controller to establish a lock on a memory location, and prior to receiving a reply to the lock command communicating a data access request to the memory location from the initiator network interface controller. Prior to receiving a reply to the data access request, an unlock command issues from the initiator network interface controller. The target network interface controller determines the lock content, and when permitted by the lock accesses the memory location. After accessing the memory location the target network interface controller executes the unlock command. When the lock prevents data access, the lock operation is retried a configurable number of times until data access is allowed or a threshold is exceeded.

16 Claims, 5 Drawing Sheets

(56) References Cited

U.S. PATENT DOCUMENTS

| | | | | |
|---|---|---|---|---|
| 6,490,662 | B1* | 12/2002 | Pong | G06F 11/1666 |
| | | | | 711/128 |
| 6,523,066 | B1* | 2/2003 | Montroy | G06F 9/52 |
| | | | | 707/999.008 |
| 8,213,315 | B2 | 7/2012 | Crupnicoff et al. | |
| 2010/0191711 | A1* | 7/2010 | Carey | G06F 9/52 |
| | | | | 707/704 |
| 2011/0116512 | A1* | 5/2011 | Crupnicoff | H04L 67/14 |
| | | | | 370/463 |
| 2012/0023295 | A1* | 1/2012 | Nemawarkar | H04L 47/621 |
| | | | | 711/130 |
| 2014/0181823 | A1* | 6/2014 | Manula | G06F 9/546 |
| | | | | 718/102 |

OTHER PUBLICATIONS

PCI Express® Base Specification, Revision 3.1, 1073 pages, Mar. 2014.

\* cited by examiner

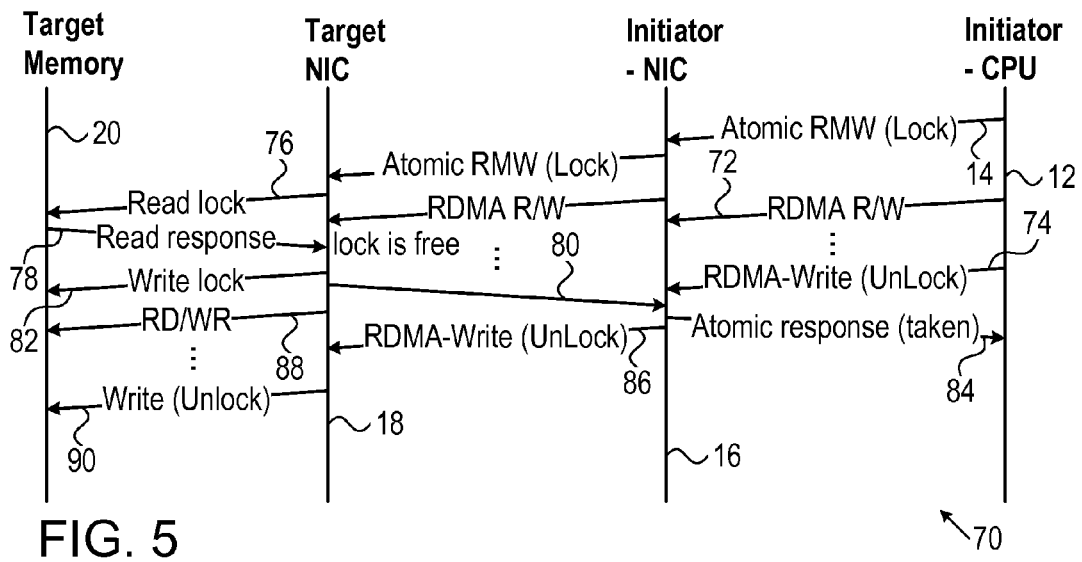
FIG. 5
FIG. 6
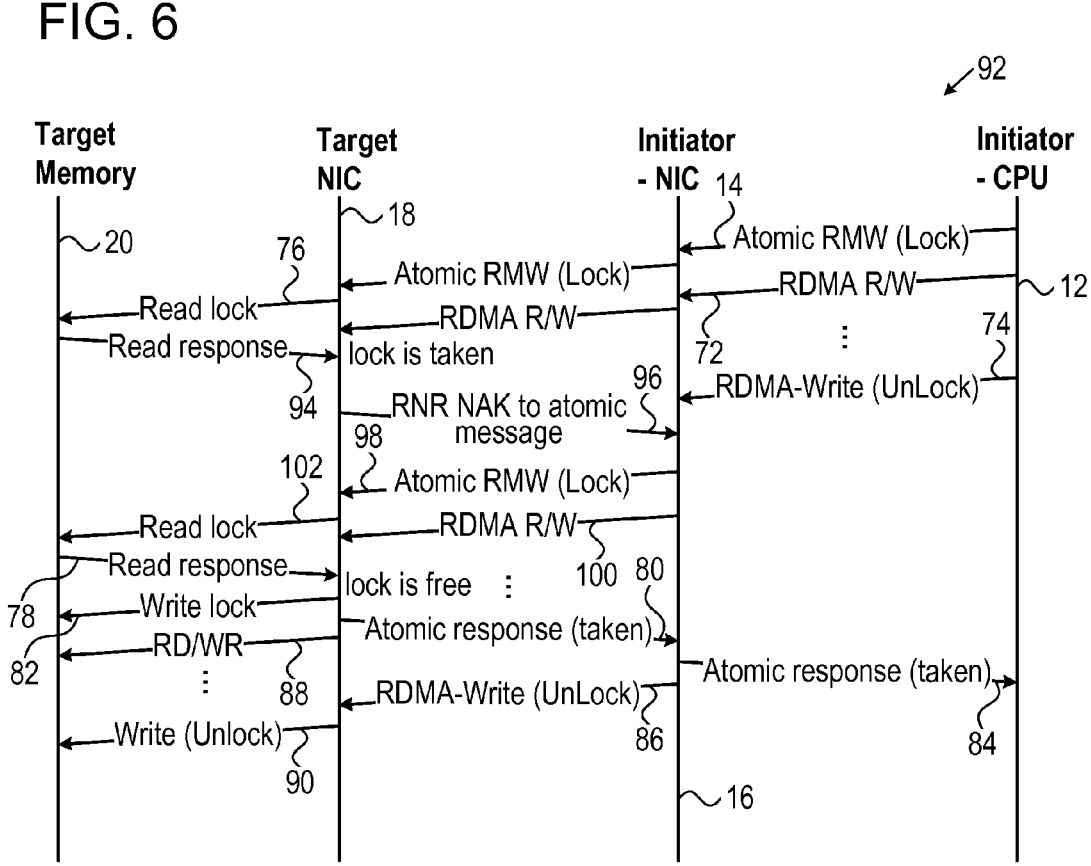

ACCELERATING AND OFFLOADING LOCK ACCESS OVER A NETWORK

CROSS-REFERENCE TO RELATED APPLICATIONS

This Application claims the benefit of U.S. Provisional Application No. 62/035,527, filed 11 Aug. 2014, which is herein incorporated by reference.

BACKGROUND OF THE INVENTION

1. Field of the Invention

This invention relates to computer networks. More particularly, this invention relates to inter-process communication over computer networks.

2. Description of the Related Art

The meanings of certain acronyms and abbreviations used herein are given in Table 1.

TABLE 1

Acronyms and Abbreviations

| | |
|---|---|
| CPU | Central Processing Unit |
| NAK | Negative Acknowledgement |
| NIC | Network Interface Controller |
| PCIe | Peripheral Component Interconnect Express |
| RDMA | Remote Direct Memory Access |
| RMW | Read-Modify-Write |
| RNR | Resource Not Ready |

Despite many proposals for lock-free resource allocation, locks are still commonly used to synchronize between execution threads or processes accessing a shared resource (also known as a "protected region"). Generally speaking, a thread trying to access a shared resource is required to make sure that it is safe to do so. Checking for safety is done by observing the value of the lock variable. Software convention defines when the lock is free and access to the shared resource is safe.

After observing the value of the lock variable, and if the lock was free, the lock value is set to a value noting that the lock is taken. Reading and checking the lock content or value, and writing that it is taken, must happen in an atomic way to prevent race conditions where multiple threads try to acquire the lock concurrently.

Turning now to the drawings, Reference is initially made to FIG. 1, which is an event diagram 10 illustrating a method of lock access in accordance with the prior art. A computational thread, (initiator 12) wishing to access shared resources over the network sends a lock acquisition command, i.e., an atomic read-modify-write (RMW) lock command, i.e., an atomic read-modify-write (RMW) lock command 14 (atomic compare-and-swap is an example) to a network interface controller, initiator NIC 16, that provides network access to the initiator 12.

The RMW lock command 14 can execute within initiator NIC 16 or can be transferred over a bus, e.g., a peripheral component interconnect express (PCIe) bus, and be executed by the central processing unit (CPU) of the initiator 12. In the example of FIG. 1, the initiator NIC 16 relays the RMW lock command 14 over a network to a target NIC 18, which executes the command on target memory 20 (arrows 22, 24), thereby establishing a lock on a region of the target memory 20. The result of the command execution is transmitted as atomic response 26 from the target NIC 18 back to the initiator 12 via the initiator NIC 16.

The initiator 12 waits for the network access to complete, evaluates the atomic response 26, and concludes that the protected region of the target memory 20 is available to it. The protected region is of course locked against other processes. The initiator 12 then proceeds to access the protected region of the target memory 20 by issuing at least one RDMA access request 28, which is relayed via the NICs 16, 18 and reach the target memory 20 as access request 30. Once the access operation in the protected region is complete, the initiator 12 releases the lock by writing a new value into it as RDMA access request 32, which is transmitted and executed as RDMA write operation 34.

Reference is now made to FIG. 2, which is an event diagram 36 illustrating the method of lock access shown in FIG. 1 in which the requested resource is not immediately available, in accordance with the prior art. After RMW lock command 14 and the read request (arrow 22) are issued, the write request to establish a lock cannot be fulfilled as the resource is already locked. This situation is reported in atomic response 38. The initiator 12 then makes a second attempt to acquire the lock, by issuing another instance of RMW lock command 14, which now succeeds. However, in general several attempts may be necessary before RMW lock command 14 ultimately succeeds, after which the events proceed in the manner described above with respect to FIG. 1. The details are not repeated in the interest of brevity.

The synchronization management system represented by the event diagram 36 is sensitive to lock contention, and the above described operations can incur considerable overhead. In the case of remote transactions, there is at least one round trip over the network to make sure that the lock is actually taken, and the CPU is busy managing the lock and cannot do other tasks.

SUMMARY OF THE INVENTION

Efficiencies developed in RDMA technology enable locks and shared resources to be resident locally or in a remote compute node. For example, commonly assigned co-pending application Ser. No. 14/665,043, which is herein incorporated by reference, discloses one efficient method for carrying out remote transactions over a data network between an initiator host and a remote target.

Embodiments of the invention provide for offloading to a remote NIC the functions of checking that the lock is free and acquiring the lock. This saves at least one round trip over the network, and eliminates the CPU effort of verifying that the lock is free, thereby reducing latency and conserving computer resources.

There is provided according to embodiments of the invention a method of communication, which is carried out in a data network by connecting an initiator and a remote target. The initiator has an initiator network interface controller. The remote target has a target network interface controller and a memory location that is accessible by at least a first process of the initiator and by a second process. The method is further carried out by issuing an atomic read-modify-write lock command from the first process to the remote target via the initiator network interface controller to establish a lock on the memory location against the second process. The method is further carried out prior to receiving a reply to the atomic read-modify-write lock command by communicating a data access request to the memory location from the initiator network interface controller, and prior to receiving a reply to the data access request, issuing an atomic unlock command from the initiator network interface controller to release the lock on the memory location. The atomic read-modify-write lock command and the data access request are received in the target network interface controller. The method is further carried out with the target network interface controller by determining a content of the lock on the memory location, and when the content of the lock does not prevent execution of the data access request accessing the memory location. The method is further carried out by after accessing the memory location by executing the unlock command with the target network interface controller.

In a further aspect of the method, when the content of the lock prevents execution of the data access request iteratively determining a content of the lock until the lock no longer prevents execution of the data access request or a termination criterion is satisfied.

An additional aspect of the method includes responsively to a satisfaction of the termination criterion communicating a failure message to the initiator network interface controller.

According to one aspect of the method, the termination criterion can be expiration of a timeout interval or can be exceeding a predetermined number of performances of determining a content of the lock on the memory location.

Another aspect of the method includes canceling the data access request, and communicating the failure message from the initiator network interface controller to the initiator.

Yet another aspect of the method is performed with the target network interface controller after determining a content of the lock by communicating the content of the lock to the initiator network interface controller in the reply to the atomic read-modify-write lock command.

Still another aspect of the method includes receiving in the initiator network interface controller a signal that indicates that a resource is not ready, and responsively to the signal, transmitting a new instance of the atomic read-modify-write lock command and the data access request to the target network interface controller.

There is further provided according to embodiments of the invention a communications apparatus including an initiator having an initiator network interface controller and a remote target connected to the initiator by a data network. The remote target has a target network interface controller and a memory location that is accessible by at least a first process of the initiator and by a second process. The initiator and the remote target are cooperative to perform a method including issuing an atomic read-modify-write lock command from the first process to the remote target via the initiator network interface controller to establish a lock on the memory location against the second process. The method is further carried out prior to receiving a reply to the atomic read-modify-write lock command by communicating a data access request to the memory location from the initiator network interface controller, and prior to receiving a reply to the data access request, issuing an atomic unlock command from the initiator network interface controller to release the lock on the memory location. The atomic read-modify-write lock command and the data access request are received in the target network interface controller. The method is further carried out with the target network interface controller by determining a content of the lock on the memory location, and when the content of the lock does not prevent execution of the data access request accessing the memory location. The method is further carried out after accessing the memory location by executing the unlock command with the target network interface controller.

BRIEF DESCRIPTION OF THE SEVERAL VIEWS OF THE DRAWINGS

For a better understanding of the present invention, reference is made to the detailed description of the invention, by way of example, which is to be read in conjunction with the following drawings, wherein like elements are given like reference numerals, and wherein:

FIG. 5 is an event diagram illustrating a method of lock access in which the lock is available in accordance with an embodiment of the invention;

FIG. 6 is an event diagram illustrating a method of lock access in which the lock is initially unavailable in accordance with an embodiment of the invention.

DETAILED DESCRIPTION OF THE INVENTION

Figure 1:
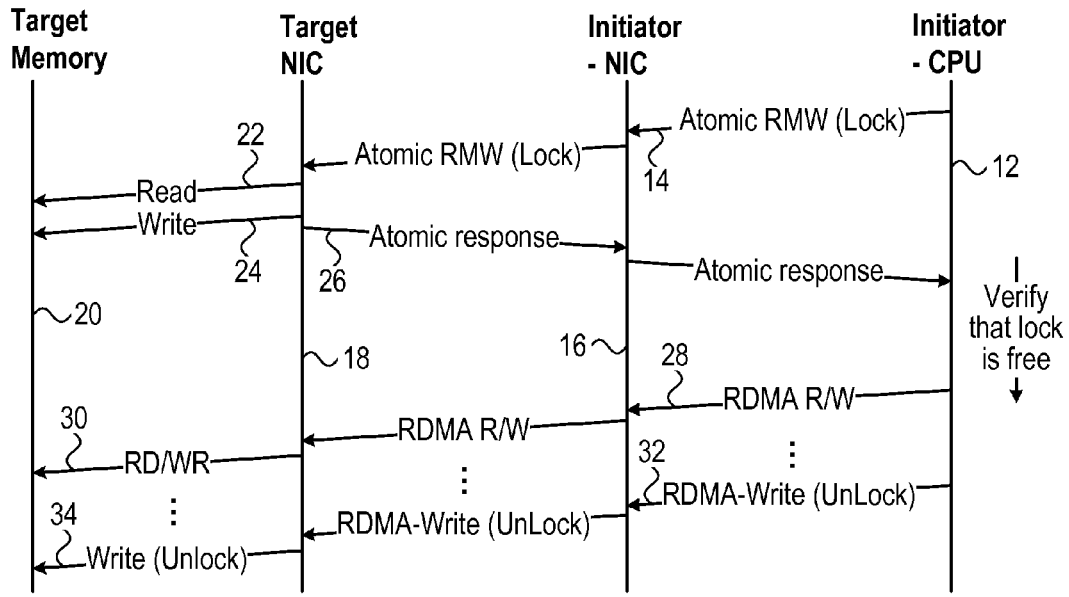
FIG. 1 is an event diagram illustrating a method of lock access in accordance with the prior art.

In the following description, numerous specific details are set forth in order to provide a thorough understanding of the various principles of the present invention. It will be apparent to one skilled in the art, however, that not all these details are necessarily always needed for practicing the present invention. In this instance, well-known circuits, control logic, and the details of computer program instructions for conventional algorithms and processes have not been shown in detail in order not to obscure the general concepts unnecessarily.

Definitions.

A "network" is a collection of interconnected hosts, computers, peripherals, terminals, and databases.

A "transaction" refers to remote accesses to a memory resource.

A "local host" is a device that initiates a transaction with another device.

The term "remote host" refers to a target of a transaction that communicates with a local host via a network, e.g., Ethernet, InfiniBand™, and similar networks via any number of network nodes. In the context of this disclosure, the local host and remote host are usually referred to as an "initiator" and a "remote target", respectively.

The term "remote transaction" refers to a transaction between a local host and a remote host that is initiated and conducted by a local host, and in which memory accesses occur on a memory of the remote host as a result of IO operations between the local host and the remote host over a network.

A "lock" is a synchronization mechanism for enforcing a concurrency control policy on access to a shared resource (also known as a "protected region") in an environment where there are many executing processes or threads that may desire the resource.

Overview.

Locks are used to synchronize between execution threads or processes accessing shared resources. Generally speaking, a thread trying to access a shared resource is required to make sure that it is safe to do so. Checking for safety is done by observing the value of a lock variable. A software convention defines when the lock is free and that accordingly access to the shared resource is safe.

After observing the value of the lock variable, and if the lock was free, the lock value is set to a value noting that the lock is taken. Reading and checking the lock value or content, and writing that it is taken, must happen in an atomic way to prevent race conditions where multiple threads try to acquire the lock concurrently. The locks and resources may be resident locally or in a remote compute node.

The transactions described herein are performed using a reliable communication protocol. A dynamically-connected (DC) transport service, as described in commonly assigned U.S. Patent Application Publication 2011/0116512, which is herein incorporated by reference is one example of such a reliable protocol to which the principles of the invention can be applied. There are many other reliable protocols, which can also be employed, mutatis mutandis, in order to achieve the benefits of the invention.

System Architecture.

Figure 3:
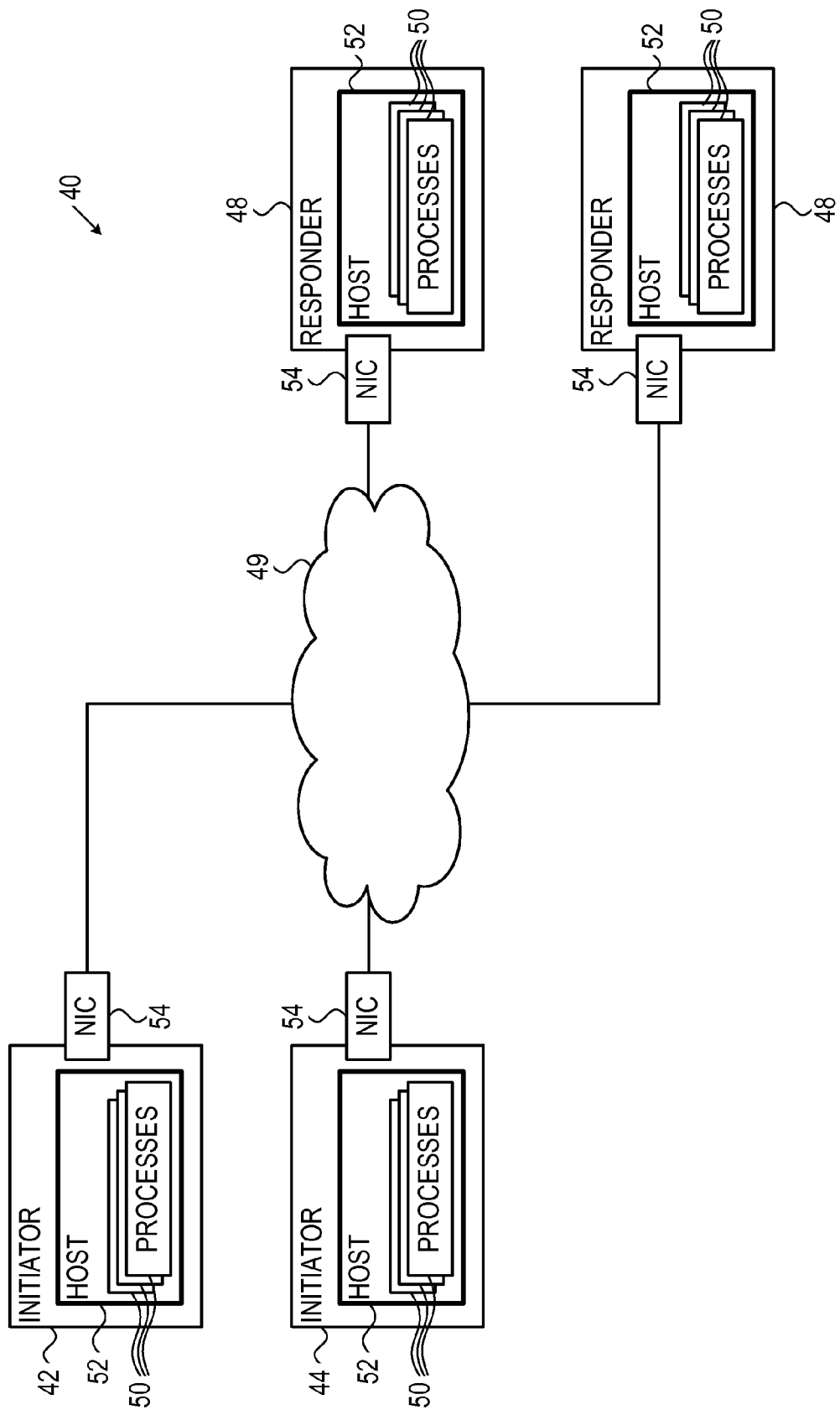
FIG. 3 schematically illustrates a computer system in which the principles of the invention are applied.

Reference is now made to FIG. 3, which schematically illustrates an exemplary computer system 40, in which the principles of the invention are applied. System 40 comprises nodes 40, 42, 44, 46, which are interconnected by a packet network 48, such as an InfiniBand switch fabric. In the pictured embodiment, nodes 42 and 44 are initiator nodes, while nodes 46 and 48 are responder nodes, but typically any given node may be both an initiator and a responder concurrently. In this example, there is an initiator process from a group of processes 50 executing on a host 52. Node 42 or node 44, functioning as the initiator, submits a request for a resource to NIC 54 (e.g., an InfiniBand host channel adapter) to send a message to a target process from among a group of processes 50 executing on the host 52 of a target (responder) node 46, 48. Upon receiving the work request, The NIC of the initiator node sends a packet to the NIC of the responder node to establish a connection. As noted above, any reliable protocol is suitable for the connection.

Figure 4:
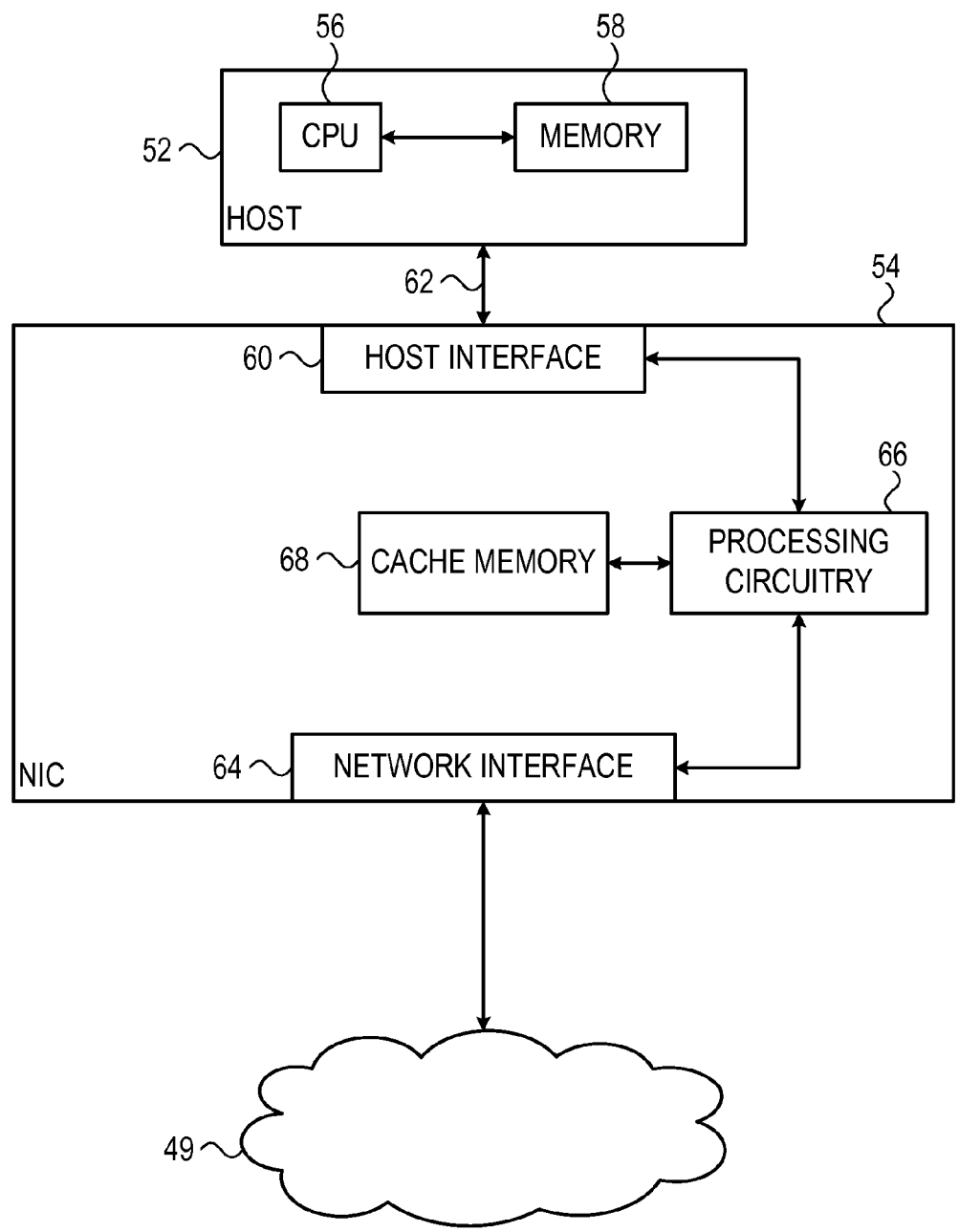
FIG. 4 is a block diagram of a computing node in the system shown in FIG. 3.

Reference is now made to FIG. 4, which is a block diagram of a computing node, in accordance with an embodiment of the invention that schematically illustrates functional components of nodes 42, 44, 46, 48 (FIG. 3), and particularly the elements of NIC 54 that are involved in providing transport service, in accordance with an embodiment of the invention. Host 52 comprises a central processing unit (CPU) 56, which runs processes 50 (FIG. 1) and a host memory 58. This memory is typically used to hold both process and system data and context information used by NIC 54. NIC 54 comprises a host interface 60 for communicating with host 52 via a bus 62 and a network interface 64 for transmitting and receiving packets to and from network 49. The functions described below are carried out by processing circuitry 66 cooperative with a suitable memory cache 68.

Lock Mechanism.

Figure 2:
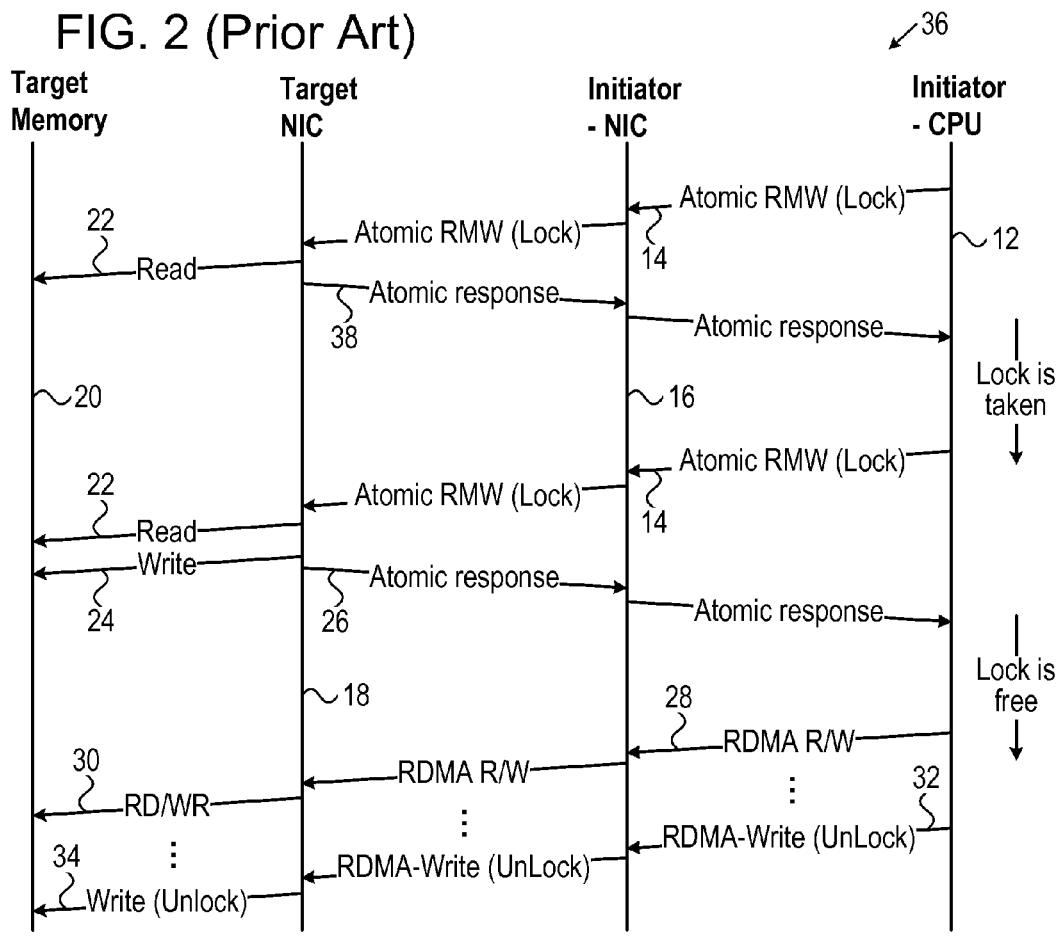
FIG. 2 is an event diagram illustrating the method of lock access shown in FIG. 1 in which the requested resource is not immediately available in accordance with the prior art.

Reference is now made to FIG. 5, which is an event diagram 70 illustrating a method of lock access in which the lock is available in accordance with an embodiment of the invention. Event diagram 70 has the same actors as shown in FIG. 1 and FIG. 2: initiator 12, initiator NIC 16, target NIC 18, and target memory 20. As in FIG. 1, an atomic read-modify-write lock acquisition RMW lock command 14 is transmitted from initiator 12 to initiator NIC 16 and relayed by the initiator NIC 16 to the target NIC 18.

Without waiting for the results of the RMW lock command 14, the initiator 12 takes two actions:

(1) the RMW lock command 14 is followed directly by RDMA memory access request 72, which also reaches the target NIC 18 via the initiator NIC 16; and (2) without delay, the initiator 12 issues a lock-release command 74, which can be an atomic request or a RDMA-write command. The initiator 12 trusts the target NIC 18 to perform the lock-release after all required RDMA accesses have completed.

Upon receipt of the RMW lock command 14 the target NIC 18 issues read-lock operation 76 to the target memory 20 and obtains read response 78. The read-lock operation 76 can issue even before the target NIC 18 receives the RDMA memory access request 72. The initiator 12 is guaranteed that when the lock on the target memory 20 is eventually acquired the RDMA memory access request 72 will be accomplished.

In the example of FIG. 5, the desired region of the target memory 20 is not locked, and the target NIC 18 is so informed by read response 78. The target NIC 18 thereupon takes two actions:

(1) an atomic response 80 informing that the lock on the target memory 20 is free is sent to the initiator NIC 16; and (2) a write-lock operation 82 is directed to the target memory 20.

The atomic response 80 is relayed by the initiator NIC 16 to the initiator 12 as atomic response 84, and, as noted above, the lock-release command 74 is sent to the target NIC 18 as lock-release command 86. The lock-release command 74 typically occurs before the atomic response 84 as shown in FIG. 5. However, the order of the two events is not defined, and the two events could occur in a reverse order.

By the time the lock-release command 74 reaches the target NIC 18, the target NIC 18 has already executed memory access 88 in accordance with the RMW lock command 14. In response to the lock-release command 74, the target NIC 18 frees the lock by directing a write-unlock operation 90 on the target memory 20.

In case the lock on the target memory 20 is taken by another process, the target NIC 18 needs to delay or possibly reject any outstanding operations until the lock is released. Reference is now made to FIG. 6, which is an event diagram 92 illustrating a method of lock access in which the lock is initially unavailable in accordance with an embodiment of the invention. The RMW lock command 14, RDMA memory access request 72 and read-lock operation 76 are executed as described with respect to FIG. 5. However, in this example, read response 94, unlike read response 78 shown above, indicates that the desired region of target memory 20 is currently locked and unavailable. A negative acknowledgement 96 (RNR NAK) is returned by the target NIC 18 to the initiator NIC 16.

Upon receipt of the negative acknowledgement 96 the initiator NIC 16 automatically transmits a repeat atomic RMW lock command 98 and a repeat RDMA memory access request 100 to the target NIC 18. The target NIC 18 reacts to the repeat RDMA memory access request 100 by directing another read-lock operation 102 to the target memory 20.

In this example read response 78 is returned, indicating that the lock is now available.

The target NIC 18 responds to the read response 78 by transmitting atomic response 80 to the initiator NIC 16, which relays it to the initiator 12 as atomic response 84, and by performing write-lock operation 82 and memory access 88. Accordingly RDMA lock-release command 86 is sent to the target NIC 18, typically in a fully pipelined manner. The target NIC 18 is responsible to await completion of all previous commands and only then releases the lock by directing write-unlock operation 90 to the target memory 20.

It will be evident from the sequence of FIG. 6 that unavailability of the lock imposes no overhead on the initiator 12. Rather all negotiations and communications regarding the lock are carried out cooperatively by the initiator NIC 16 and the target NIC 18. The initiator 12 has pre-authorized the initiator NIC 16 to deal with releasing the lock once the RDMA memory access request 72 has been satisfied. The ultimate reception of atomic response 84 in the initiator 12 simply makes the process executing in initiator 12 aware that RDMA memory access request 72 has succeeded.

Figure 7:
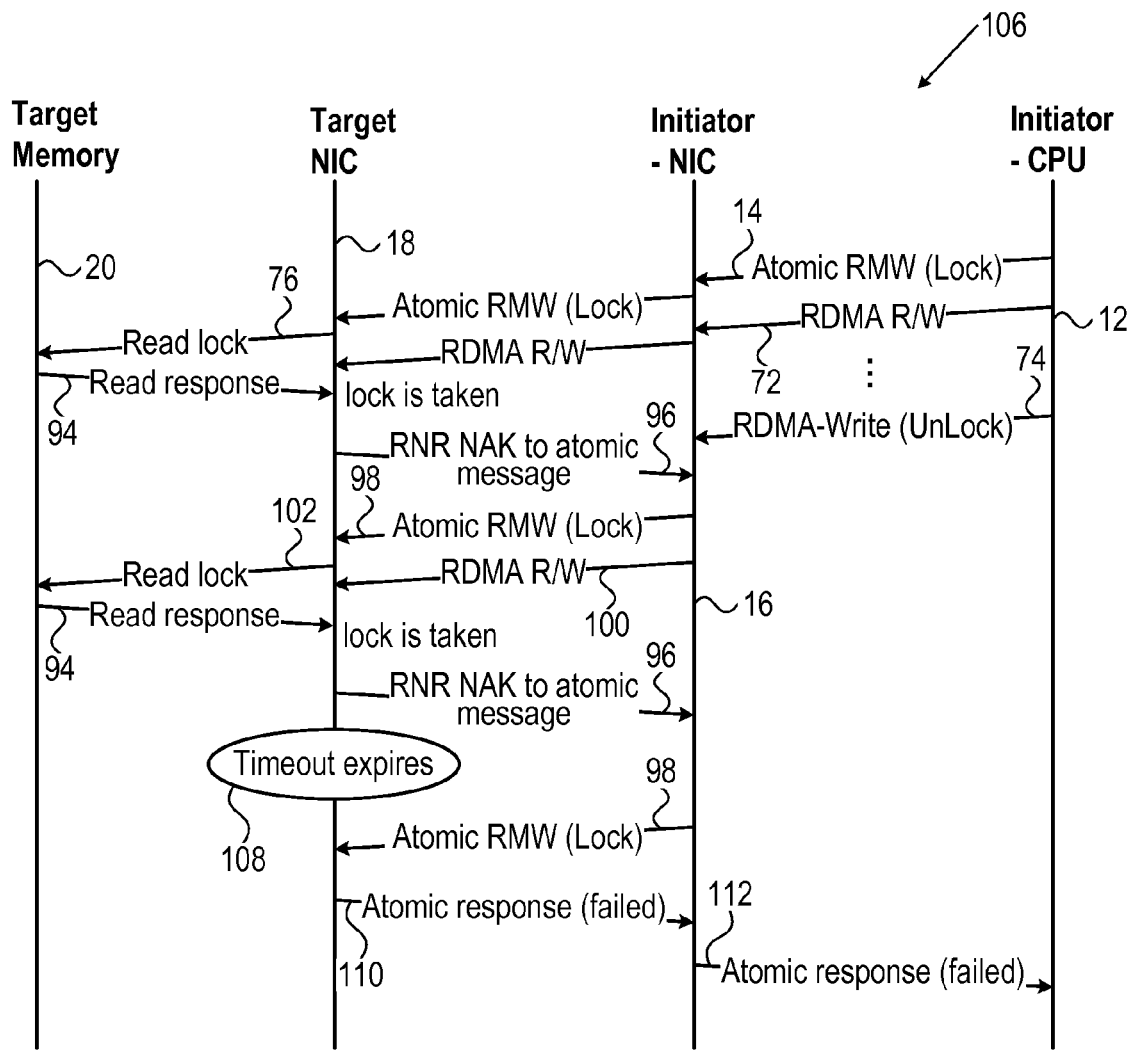
FIG. 7 is an event diagram illustrating a method of lock access in which the lock fails to become available in accordance with an embodiment of the invention.

Reference is now made to FIG. 7, which is an event diagram 106 illustrating a method of lock access in which the lock fails to become available in accordance with an embodiment of the invention. When read response 78 indicates unavailability of the lock, the sequence: negative acknowledgement 96; atomic RMW lock command 98; repeat RDMA memory access request 100, read-lock operation 102; and read response 94 iterates until some termination criterion is satisfied, e.g., a timeout or the availability of the lock. In such a pathological case, the target NIC reports back to the initiator that the lock cannot be taken.

In FIG. 7 the events proceed as in the event diagram 92 (FIG. 6), except now the read response 78, indicating a free lock never occurs. Instead several instances of the read response 94 are reported to the target NIC 18, which repeatedly sends negative acknowledgement 96 to the initiator NIC 16. Eventually a termination criterion may be satisfied. For example, after a timeout 108 occurs, the target NIC 18 responds to the next instance of the atomic RMW lock command 98 by generating an atomic failure response 110, which is relayed by the initiator NIC 16 to the initiator 12 as relayed atomic failure response 112, thereby informing the originating process in the initiator 12 that the desired memory access cannot be achieved. Typically the value of the lock variable, obtained from the read response 94, is included in the atomic failure response 110.

Alternatively to the timeout 108, the target NIC 18 can implement a configurable counter counting the number of RNR NAKs. When this number exceeds a predefined, installation-dependent threshold value, the termination criterion is satisfied; atomic failure response 110 and atomic failure response 112 are then transmitted as described above, and the operation aborts.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

The invention claimed is:

1. A method of communication comprising the steps of:
   in a data network connecting an initiator and a remote target, the initiator having an initiator network interface controller, and the remote target having a target network interface controller and a memory location that is accessible by at least a first process of the initiator and by a second process:
   issuing an atomic read-modify-write lock command from the first process to the remote target via the initiator network interface controller to establish a lock on the memory location against the second process;
   prior to receiving a reply to the atomic read-modify-write lock command, communicating a data access request to the memory location from the initiator network interface controller;
   prior to receiving a reply to the data access request issuing an atomic unlock command from the initiator network interface controller to release the lock on the memory location;
   receiving the atomic read-modify-write lock command and the data access request in the target network interface controller;
   with the target network interface controller determining a content of the lock on the memory location;
   when the content of the lock does not prevent execution of the data access request accessing the memory location; and
   after accessing the memory location executing the unlock command with the target network interface controller.

2. The method according to claim 1, further comprising the steps of:
   when the content of the lock prevents execution of the data access request iterating the step of determining a content of the lock until the lock no longer prevents execution of the data access request or a termination criterion is satisfied.

3. The method according to claim 2, further comprising the steps of:
   responsively to a satisfaction of the termination criterion communicating a failure message to the initiator network interface controller.

4. The method according to claim 3, wherein the termination criterion is expiration of a timeout interval.

5. The method according to claim 3, wherein the termination criterion is an exceeding of a predetermined number of performances of the step of determining a content of the lock on the memory location.

6. The method according to claim 3, further comprising the steps of:
   canceling the data access request; and
   communicating the failure message from the initiator network interface controller to the initiator.

7. The method according to claim 1, further comprising the steps of:
   with the target network interface controller after performing the step of determining a content of the lock communicating the content of the lock to the initiator network interface controller in the reply to the atomic read-modify-write lock command.

8. The method according to claim 7, further comprising the steps of:
   receiving in the initiator network interface controller a signal that indicates that a resource is not ready; and
   responsively to the signal, transmitting a new instance of the atomic read-modify-write lock command and the data access request to the target network interface controller.

9. A communications apparatus comprising:
   an initiator having an initiator network interface controller;
   a remote target connected to the initiator by a data network, the remote target having a target network interface controller and a memory location that is accessible by at least a first process of the initiator and by a second process, wherein the initiator and the remote target are cooperative to perform the steps of:

issuing an atomic read-modify-write lock command from the first process to the remote target via the initiator network interface controller to establish a lock on the memory location against the second process;

prior to receiving a reply to the atomic read-modify-write lock command, communicating a data access request to the memory location from the initiator network interface controller;

prior to receiving a reply to the data access request issuing an atomic unlock command from the initiator network interface controller to release the lock on the memory location;

receiving the atomic read-modify-write lock command and the data access request in the target network interface controller;

with the target network interface controller determining a content of the lock on the memory location;

when the content of the lock does not prevent execution of the data access request accessing the memory location; and after accessing the memory location executing the unlock command with the target network interface controller.

10. The apparatus according to claim 9, wherein the initiator and the remote target are further cooperative to perform the steps of:

when the content of the lock prevents execution of the data access request iterating the step of determining a content of the lock until the lock no longer prevents execution of the data access request or a termination criterion is satisfied.

11. The apparatus according to claim 10, wherein the initiator and the remote target are further cooperative to perform the steps of:

responsively to a satisfaction of the termination criterion communicating a failure message to the initiator network interface controller.

12. The apparatus according to claim 11, wherein the termination criterion is expiration of a timeout interval.

13. The apparatus according to claim 11, wherein the termination criterion is an exceeding of a predetermined number of performances of the step of determining a content of the lock on the memory location.

14. The apparatus according to claim 11, wherein the initiator and the remote target are further cooperative to perform the steps of:

canceling the data access request; and communicating the failure message from the initiator network interface controller to the initiator.

15. The apparatus according to claim 9, wherein the initiator and the remote target are further cooperative to perform the steps of:

with the target network interface controller after performing the step of determining a content of the lock communicating the content of the lock to the initiator network interface controller in the reply to the atomic read-modify-write lock command.

16. The apparatus according to claim 15, wherein the initiator and the remote target are further cooperative to perform the steps of:

receiving in the initiator network interface controller a signal that indicates that a resource is not ready; and responsively to the signal, transmitting a new instance of the atomic read-modify-write lock command and the data access request to the target network interface controller.

* * * * *